United States Patent [19]

Marks

[11] Patent Number: 6,061,055
[45] Date of Patent: May 9, 2000

[54] METHOD OF TRACKING OBJECTS WITH AN IMAGING DEVICE

[75] Inventor: Richard Lee Marks, Pleasanton, Calif.

[73] Assignee: Autodesk, Inc., San Rafael, Calif.

[21] Appl. No.: 08/823,302

[22] Filed: Mar. 21, 1997

[51] Int. Cl.[7] .............................. G06F 3/14; H04N 7/15; G06K 9/32

[52] U.S. Cl. ..................... 345/327; 345/330; 345/349; 345/972; 348/169; 348/15; 382/103

[58] Field of Search ..................... 345/327, 328, 345/330, 348, 349, 354, 346, 970, 972; 348/169, 170, 214, 213, 15; 382/103, 209, 218

[56] References Cited

U.S. PATENT DOCUMENTS

| | | | |
|---|---|---|---|
| 5,060,135 | 10/1991 | Levine et al. | 345/351 |
| 5,179,421 | 1/1993 | Parker et al. | 348/169 X |
| 5,268,734 | 12/1993 | Parker et al. | 348/169 X |
| 5,280,530 | 1/1994 | Trew et al. | 382/103 |
| 5,349,658 | 9/1994 | O'Rourke et al. | 345/349 |
| 5,432,597 | 7/1995 | Parker et al. | 348/169 X |
| 5,434,617 | 7/1995 | Bianchi | 348/170 |
| 5,465,144 | 11/1995 | Parker et al. | 356/139.06 |
| 5,471,296 | 11/1995 | Parker et al. | 348/213 X |
| 5,473,369 | 12/1995 | Abe | 348/169 |
| 5,517,300 | 5/1996 | Parker et al. | 348/169 X |
| 5,521,634 | 5/1996 | McGary | 348/169 |
| 5,523,783 | 6/1996 | Cho | 348/169 X |
| 5,534,917 | 7/1996 | MacDougall | 348/169 |
| 5,561,518 | 10/1996 | Parker et al. | 348/169 X |
| 5,561,519 | 10/1996 | Parker et al. | 348/169 X |
| 5,570,177 | 10/1996 | Parker et al. | 348/169 X |
| 5,572,317 | 11/1996 | Parker et al. | 348/169 X |
| 5,598,209 | 1/1997 | Cortjens et al. | 348/15 X |
| 5,610,653 | 3/1997 | Abecassis | 348/170 |
| 5,706,457 | 1/1998 | Dwyer et al. | 345/349 |
| 5,708,845 | 1/1998 | Wistendahl et al. | 345/327 X |
| 5,867,584 | 2/1999 | Hu et al. | 382/103 |

*Primary Examiner*—Raymond J. Bayerl
*Attorney, Agent, or Firm*—Kent R. Richardson; Wilson, Sonsini, Goodrich & Rosati

[57] ABSTRACT

A method of tracking a target object using a computer system. The computer system includes a computer, a display device, and an imaging device. The computer is coupled to the display device and the imaging device. The method comprises the following steps. Capture a first image using the imaging device, the first image corresponds to the target object. Generate a second image from the first image, the second image also corresponds to the target object. Display the second image on the display device. Responsive to receiving a selection signal, the computer system sends control signals to the imaging device to track the target object. The selection signal corresponds to a selection of the second image.

16 Claims, 6 Drawing Sheets

METHOD OF TRACKING OBJECTS WITH AN IMAGING DEVICE

BACKGROUND OF THE INVENTION

1. Copyright Notice

A portion of the disclosure of this patent document contains material which is subject to copyright protection. The copyright owner has no objection to the facsimile reproduction by any one of the patent disclosure, as it appears in the Patent and Trademark Office patents files or records, but otherwise reserves all copyright rights whatsoever.

2. Field of Invention

The invention relates to the field of human machine interfaces. In particular, one embodiment of the invention relates to an interface for tracking objects using a computer system.

3. Description of Related Art

Computer tracking systems allow users to track a target object using a computer system. The computer system connects to a video camera that captures images (note that the images from video cameras are also referred to as frames). The computer system searches the images and attempts to identify the location of the target object within the images. The computer system then transmits camera control instructions to the video camera to cause the video camera to track the movement of the target object. One such system is available from Sony Corporation. One aspect of a computer tracking system is the user interface. The user interface, also referred to as the graphical user interface (GUI) or the human machine interface, allows the user to interact with the computer tracking system. For example, in the Sony system, the images from the video camera are displayed on a monitor connected to the video camera. The video camera includes a computer which executes a tracking application. By interacting with the tracking application's graphical user interface, the user can select the an image of the object to be tracked. (The object to be tracked is also referred to as the target object, or target.)

One problem with present graphical user interfaces occurs in computer tracking systems that can track one of many target objects. In such systems, it is somewhat difficult for the user to select which target to track at any given time. In some previous systems, each target is identified by a name, number, or combination of both. However, where the target's name or identity is unknown or unfamiliar to the user, the user may find it difficult to associate the different labels with the target to be tracked.

Therefore, what is desired is a computer tracking system having a more intuitive user interface which may be used with video conferencing systems.

SUMMARY OF THE INVENTION

A method of tracking a target object using a computer system. The computer system includes a computer, a display device, and an imaging device. The computer is coupled to the display device and the imaging device. The method comprises the following steps. Capture a first image using the imaging device, the first image corresponds to the target object. Generate a second image from the first image, the second image also corresponds to the target object. Display the second image on the display device. Responsive to receiving a selection signal, the computer system sends control signals to the imaging device to track the target object. The selection signal corresponds to a selection of the second image.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview of One Embodiment of the Present Invention

A method and apparatus for controlling the tracking of objects is described. In one embodiment, a computer system is coupled to a CRT and a video camera. The computer system digitizes images from the video camera that are then displayed on the CRT. A user then selects the image of a target object from the displayed images. The image of the target object is then converted to a thumbnail image. The thumbnail image is then displayed with thumbnail images of other target objects. A user can then easily select the thumbnail image of the target object to be tracked.

System View

Figure 1:
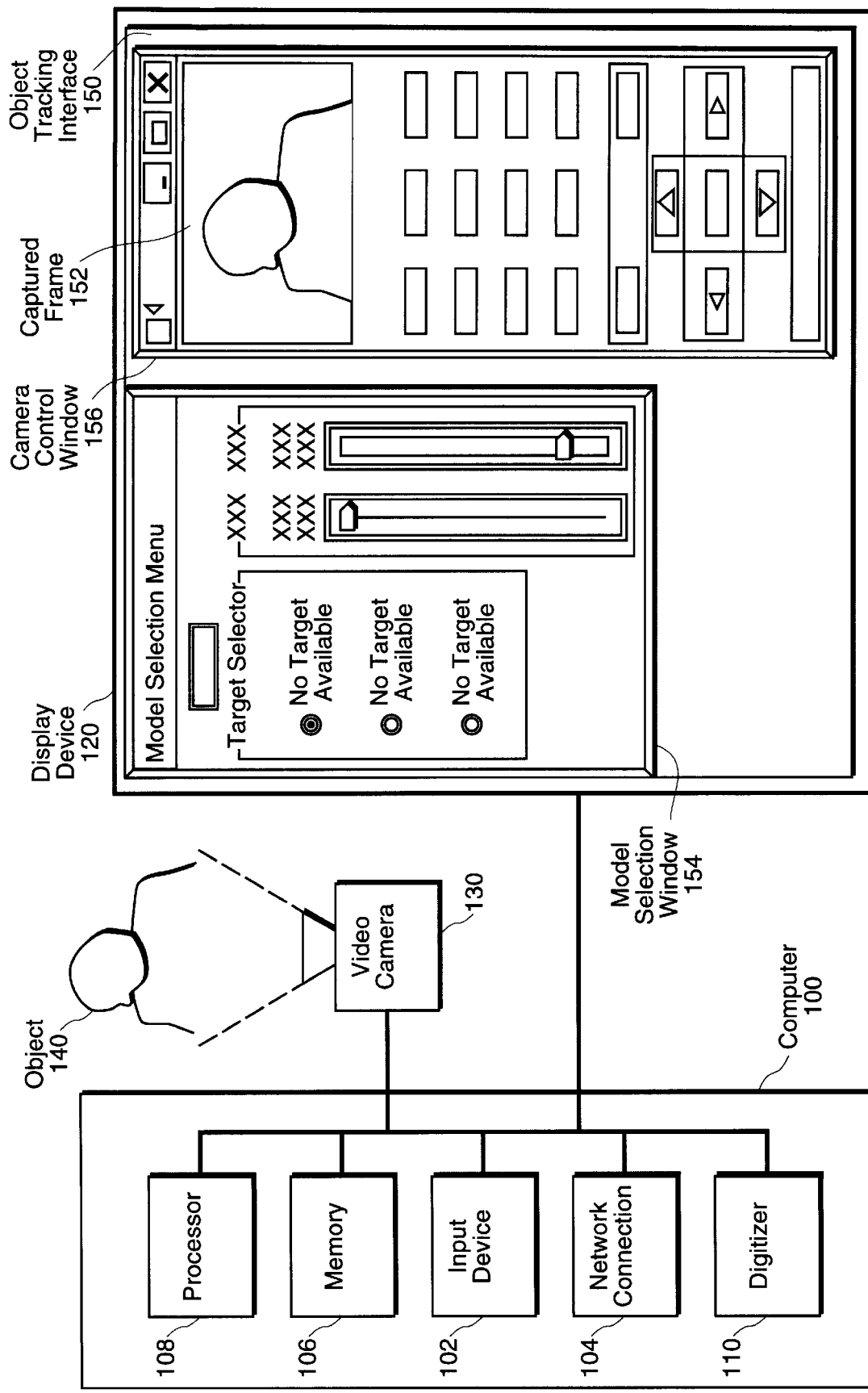
FIG. 1 illustrates a system view of one embodiment of the invention.

FIG. 1 illustrates a system view of one embodiment of the invention. The following paragraphs first describe the elements in FIG. 1, then the interconnection between those elements, and then the functions of the various elements of the system.

FIG. 1 includes the following elements: A computer 100, a display device 120, a video camera 130, and an object 140. The computer 100 includes a processor 108, a memory 106, an input device 102, a network connection 104, and a digitizer 110. The display device 120 includes the object tracking interface 150, a captured frame 152, and a model selection window 154.

The following paragraph describes the interconnection and the elements of FIG. 1. The computer 100 is connected to the video camera 130 and the display device 120. The elements within the computer 100 are connected as follows. The processor 108, the memory 106, the input device 102, the network connection 104, and the digitizer 110, communicate via a bus.

The following paragraph describes the function of the elements of FIG. 1.

The video camera 130 captures video images of any objects within its field of view. For example, in this example the video camera 130 is capturing images of the object 140. In this example, the object 140 is a person. The captured images are communicated to the computer 100.

The computer 100 is in various embodiments of the invention, a personal computer (such as a Macintosh computer, an IBM compatible personal computer, or a network computer), a workstation (such as a Sun Workstation or a workstation from Silicon Graphics Corporation), or a palm top computer.

The computer 100 uses the digitizer 110 to digitize the video images. In one embodiment, the digitizer includes an add on video processing board. In another embodiment, the digitizer 110 is built into the video camera 130. In another embodiment, the digitizer 110 is built into the computer system 100 (e.g., built into the motherboard of the computer system 100).

The memory 106 stores the digital images. The memory 106 represents general data storage areas for the computer. The memory 106, in various embodiments of the invention, includes RAM, hard disks, network storage area, and ROM.

The memory 106 also stores instructions for the processor 108. The instructions are stored as programs, applications, processes and threads. Some of the instructions cause the processor 108 to search the digitized images in the memory 106 for the location of the target object.

The memory 106 also includes information for the display device 120. This information includes the display data. The display data include the object tracking interface 150.

The input device 102 includes a mouse or other input device. The input device 102 allows the user to select various elements of the object tracking interface 150.

The network connection 104 connects the computer 100 to a computer network, such as a local area network. The network connection 104, in one embodiment, includes a network interface card from 3COM, Corporation of Santa Clara, Calif. The network connection 104 is optional.

The object tracking interface 150, as noted above, includes the captured frame 152 and the model selection window 154. The captured frame 152 corresponds to a frame captured by the video camera 130 and then digitized by the digitizer 110. The model selection window 154 allows the user to select between different targets to track.

In the example of FIG. 1 no targets are available for tracking. In other examples, the model selection window 154 includes a thumbnail image of the target. This thumbnail image was created when the selection of the target object was made by the user.

Example Flowchart

Figure 2:
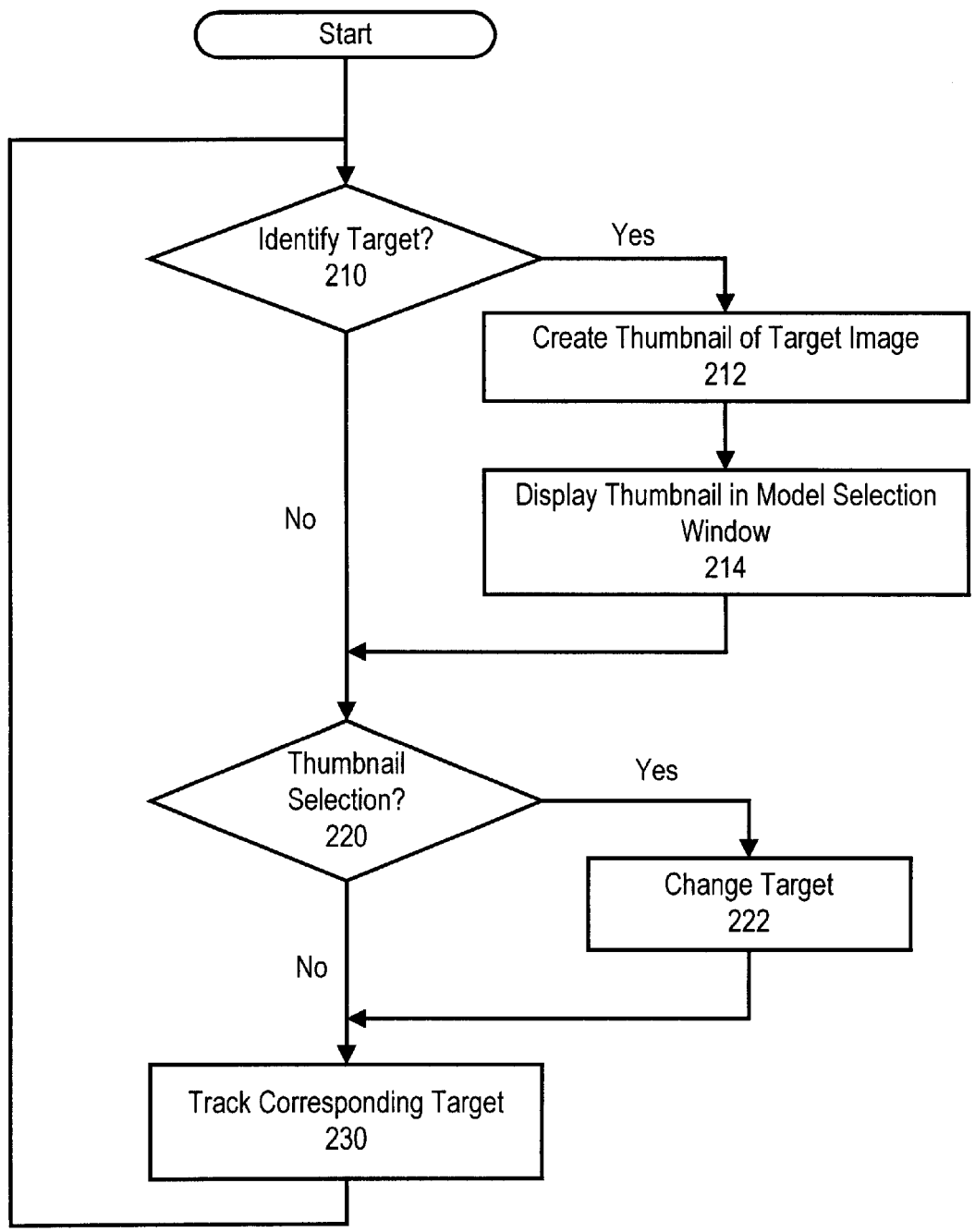
FIG. 2 illustrates one embodiment of a method of selecting an object for tracking.

FIG. 2 illustrates one embodiment of a method of selecting an object for tracking. This embodiment can be executed on the system of FIG. 1.

At block 210, the computer 100 tests to determine whether a target has been identified. In one embodiment of the invention, a user identifies a target object by defining a bounding box around the image of the target in the captured frame 152.

If a target has been identified then, at block 212, a thumbnail image of the target image is created. In one embodiment, the thumbnail image is created by point sampling pixels in the captured frame 152.

Next at block 214, the thumbnail image is displayed in the model selection window 154. Thus, the user has the actual image of the target object that can be selected. The thumbnail image allows a user to identify a target object exactly as that object was identified for tracking purposes. That is, there is a direct correlation between the look of the symbol used for selecting the target image among various target images and how that specific target image was identified originally. This is a significant improvement over previous systems in that the actual image of the target object is language independent, does not require the user to remember a label for a target, and provides a more intuitive interface.

At block 220, the computer 100 tests to determine whether the user has selected a thumbnail image. A thumbnail selection may be detected by the computer when the user positions the cursor over a thumbnail image and depresses the mouse button.

If the thumbnail image has been selected then the target, for tracking purposes, is changed. For example, if a thumbnail image is selected that corresponds to the object 140, then the computer 100 will know to look for the object 140 in images received from the video camera 130.

Next, at block 230, the computer 100 tracks the new target object corresponding to the thumbnail image selected in block 222. If no thumbnail selection occurred at block 220, then block 210 through block 222 are repeated. Repeating these blocks allows the user to select one target object out of a set of possible target objects.

Example Screen Displays

Figure 3:
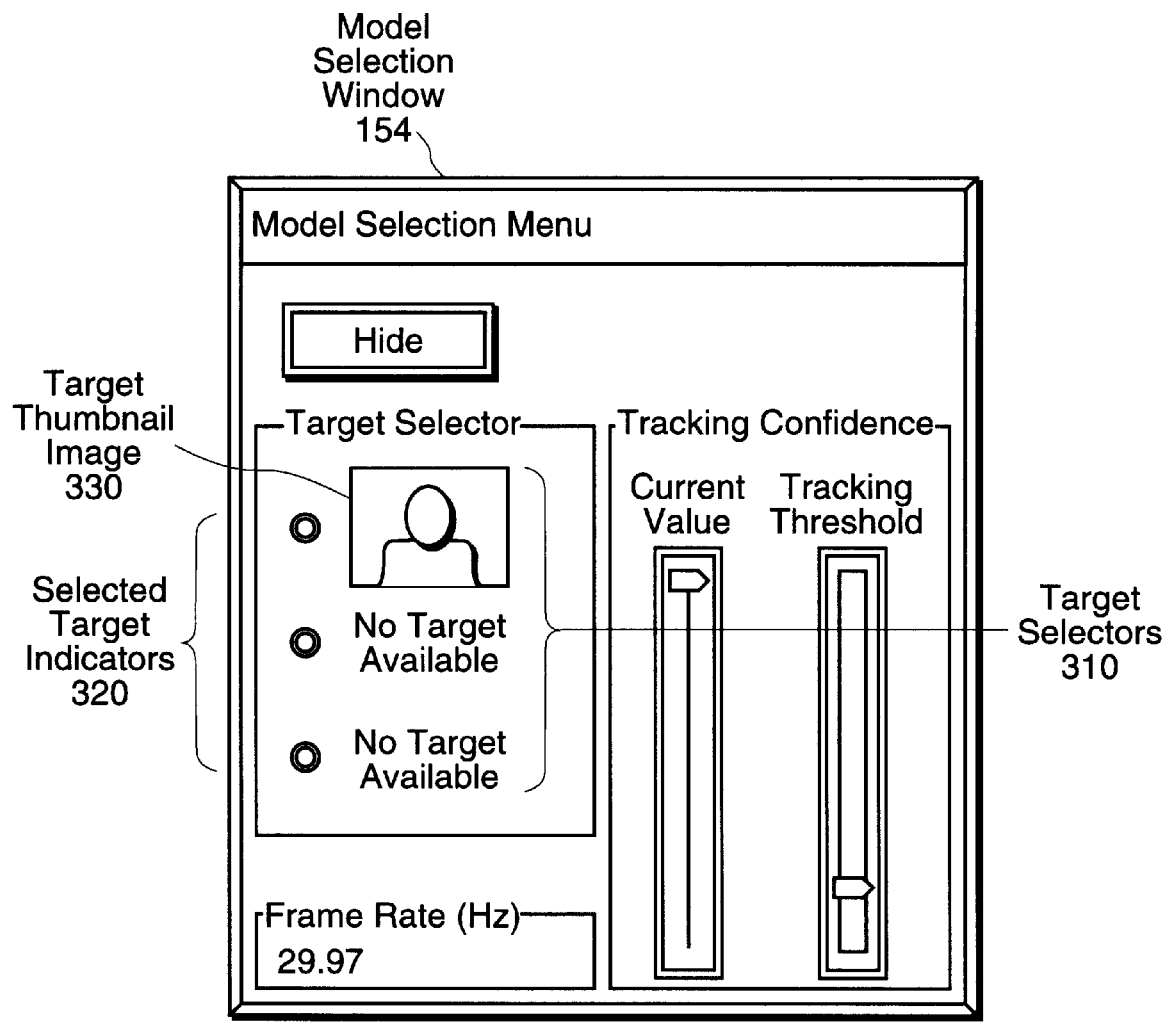
FIG. 3 illustrates a model window.

FIG. 3 illustrates an enlarged view of the model selection window 154. In one embodiment of the invention, a user interacts with the model selection window 154 to designate which target the computer 100 should track.

FIG. 3 includes the target selectors 310, the selected target indicators 320, and a thumbnail image 330. Each of the target selectors 310 can include a thumbnail image, such as the thumbnail image 330. The thumbnail image 330 corresponds to a target object. The selected targets appear next to the selected target indicators 320. The selector target indicators 320 indicate which target of potentially multiple targets is presently being tracked by the computer 100.

Other embodiments of the invention use other display configurations for showing the thumbnail target images. For example, in one embodiment, the thumbnail images are displayed as a palette. In another embodiment, the thumbnail images are displayed in the same relative position as the relative positions of the target objects in the camera's field of view.

Other embodiments use images other than thumbnail images. For example, in one embodiment, the actual captured frame 152 used to identify the target object is used in the target selectors 310. In another embodiment, only the images from within the bounding box are used. In another embodiment, the user can replace the images used the target selectors 310 with other images captured by the video camera 130. In another embodiment, the user can also include labels with the images (e.g., the names of the people in the images).

Referring back to FIG. 2, executing block 212 and block 214, causes a thumbnail image to be displayed in the target selectors 310. Executing block 222, that is, changing the target, causes the corresponding selected target indicator 320 to indicate the selected target.

Figure 4:
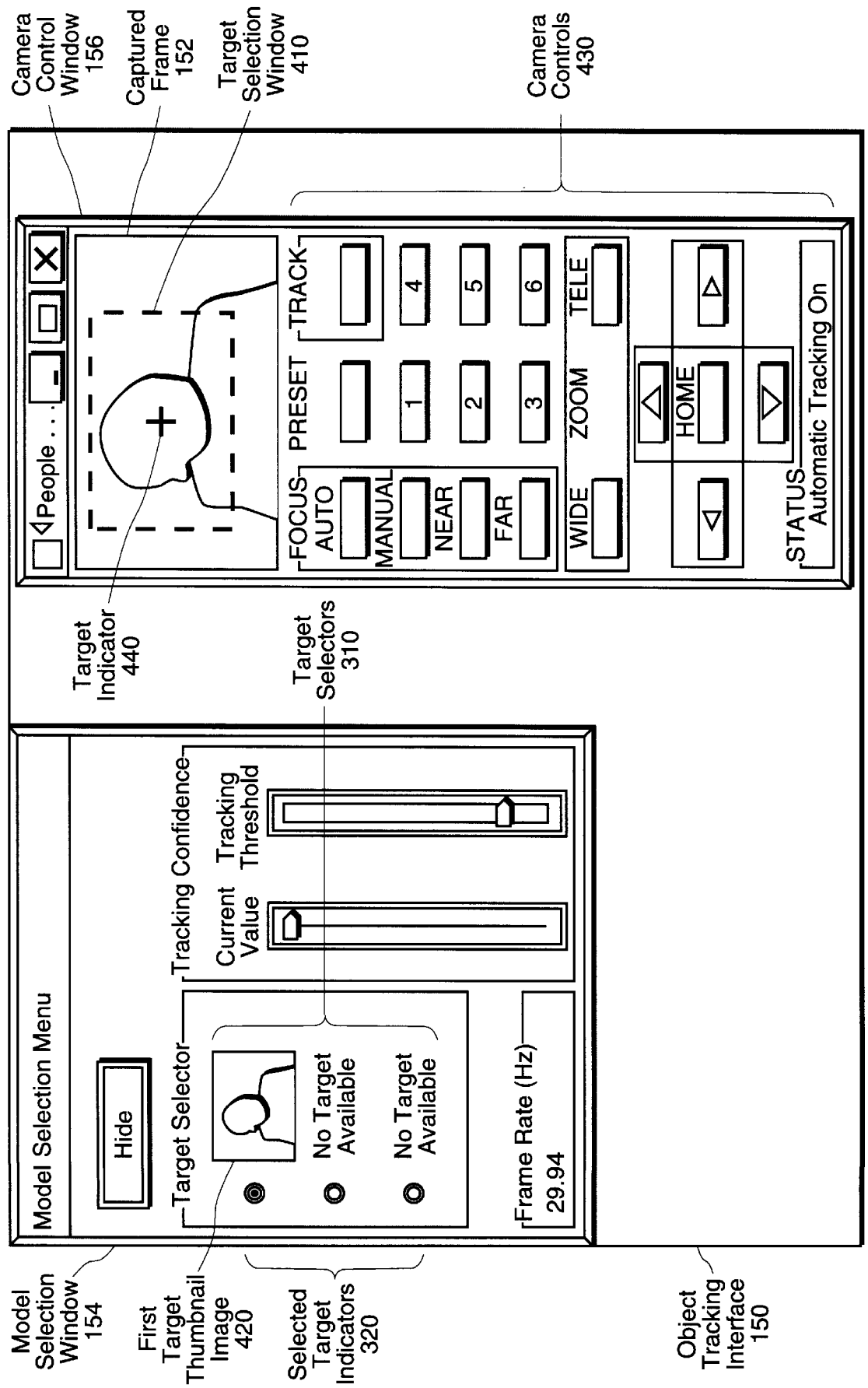
FIG. 4 illustrates identifying a first target object.

FIG. 4 illustrates one example of selecting the target, displaying the thumbnail image, and selecting the target for tracking.

FIG. 4 includes the model selection window 154 and the camera control window 156. The camera control window 156 includes the camera controls 430 and the captured frame 152. The camera controls 430 allow the user to control the video camera 130 and to identify objects for tracking.

Referring back to FIG. 2, at block 210, the target is identified in the captured frame 152 by selecting a bounding box around the area including the target object. This bounding box corresponds to the target selection window 410. Other embodiments of the invention include other target selection techniques. For example, in one embodiment, the computer 100 searches for a shape corresponding to a preset target type. For example, the computer 100 searches for an object that looks like a person. The computer 100 then selects this object for tracking. In another embodiment, the computer 100 automatically begins tracking of a moving object, for example, track the first object that moves. This type of system is useful in surveillance systems.

When a user selects the image of the target to be tracked, using the target selection window 410, the processor 108 generates the first target thumbnail image 420. The first target thumbnail image 420 is then displayed in the model selection window 154. The target selectors 310 show that the first target thumbnail image 420 includes the target object and that object is being tracked. A target indicator 440 is displayed in the captured frame 152. The target indicator 440 shows the user where the computer 100 has located the image of the object 140 in the captured frame 152.

Figure 5:
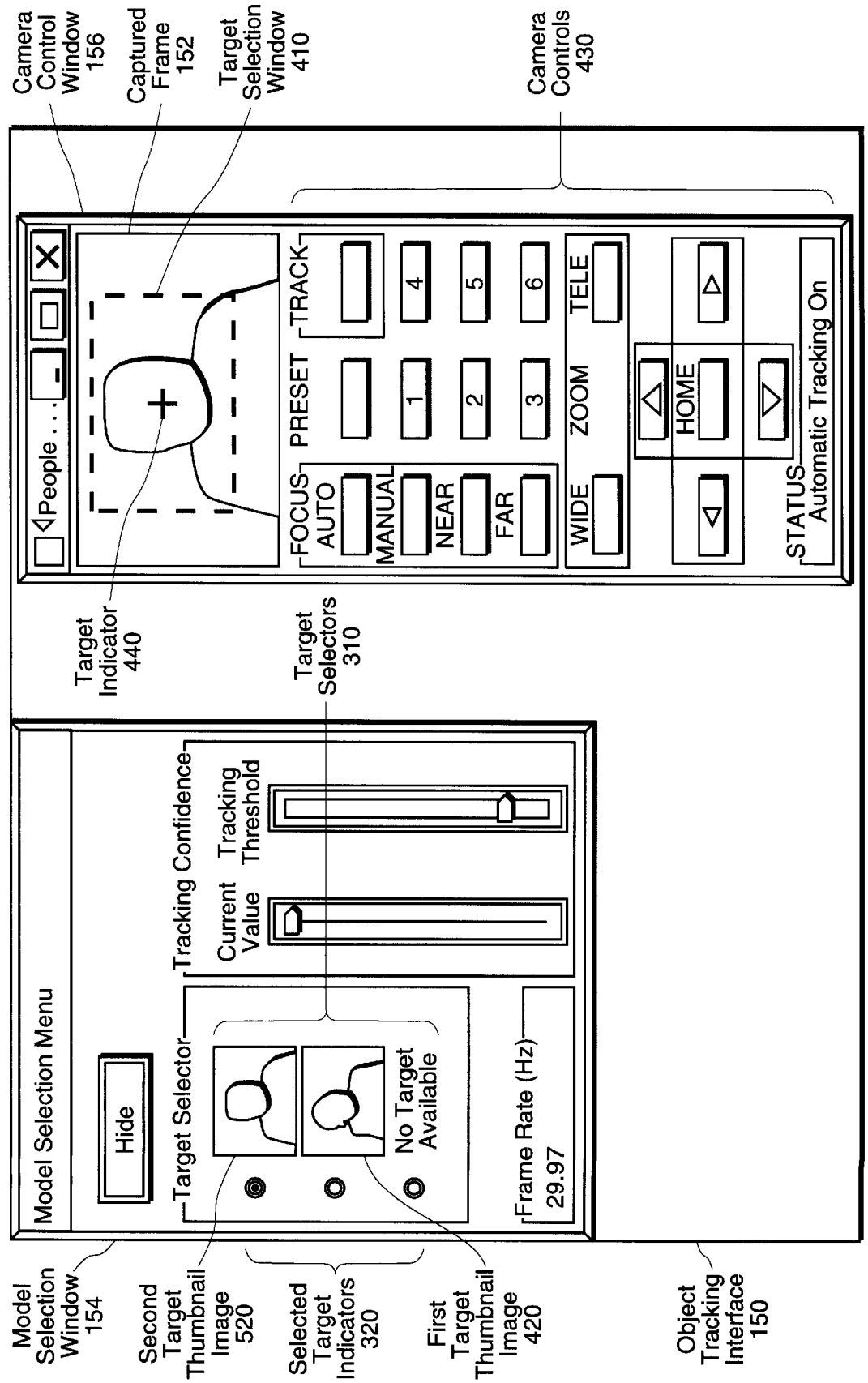
FIG. 5 illustrates identifying a second target object.

In FIG. 5 a new target is identified. Again, the user defines the target selection window 410 around the image of the object 140. The new target thumbnail image 520 is then created. The second target thumbnail image 520 is then displayed in the model selection window 154 as a target selector 310. Note that now both the second target thumbnail image 520 and the first target thumbnail image 420 are displayed. From the model selection window 154, the user can now simply select which target the computer 100 should track.

Figure 6:
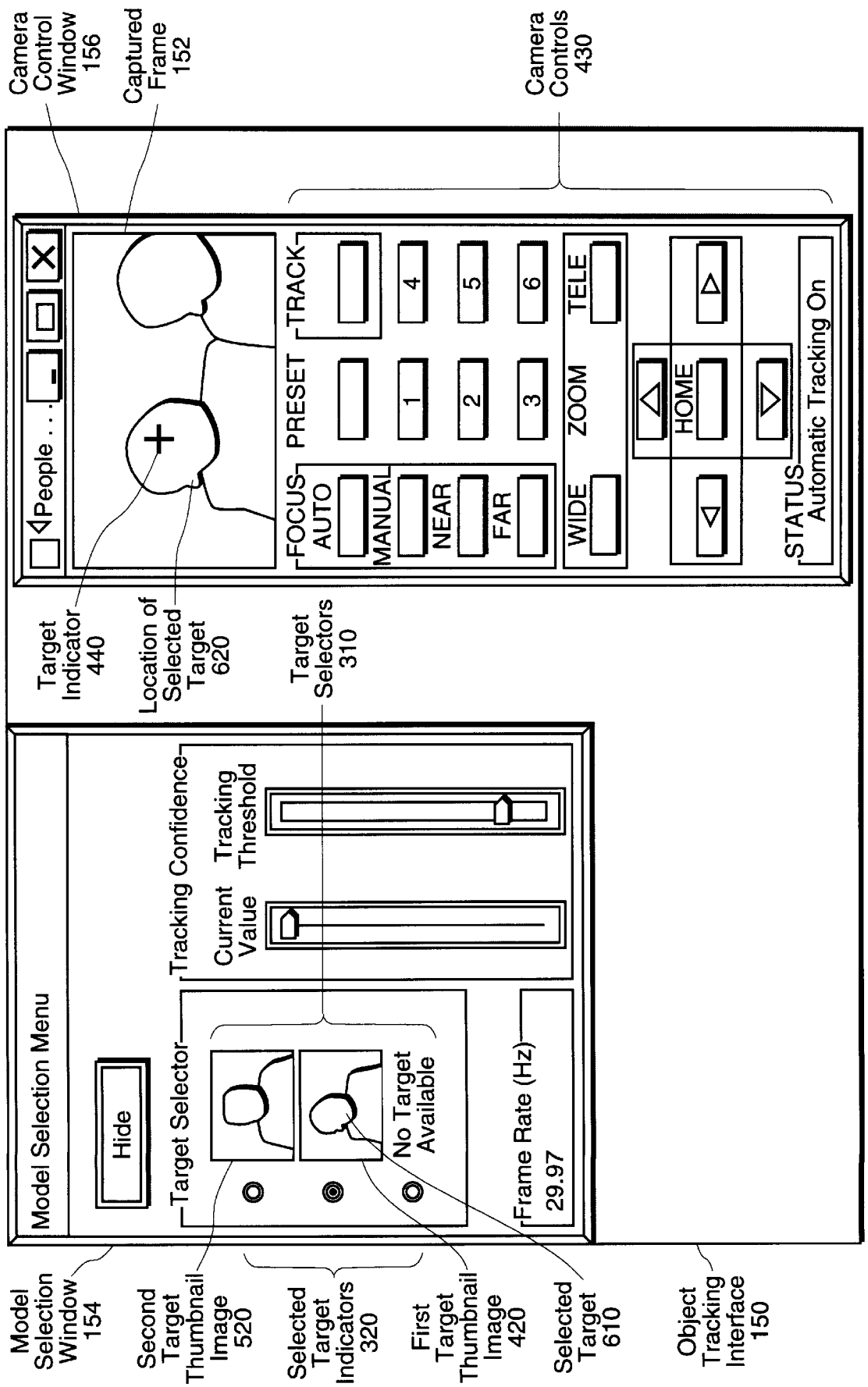
FIG. 6 illustrates selecting one of two target objects from the thumbnail images of the objects.

FIG. 6 shows that the user has selected the first target thumbnail image 420 and that the target indicator 440 is on the image of the object 140 corresponding to the first target thumbnail image 420. (Note that the target indicator 440 is not indicating the image of the second person in the captured frame 152 but is instead indicating a location of the first person.)

Additional Embodiments

In another embodiment of the invention, the graphical user interface, described in FIGS. 1 through 6, is used in a video conferencing system. Each speaker (in this context, a speaker is a person participating in the video conference, a speaker can be any person that is to be tracked) is identified using the block 210 through block 214. Accordingly, a thumbnail image is displayed for each speaker in the target selectors 310. In this embodiment, the user need only select the image of the speaker to be tracked, and the computer 100 will then begin tracking that speaker. This is a significant improvement over previous systems where the user was required to remember which pre-set location a particular speaker was speaking from.

In one embodiment of the invention, the computer 100 first returns to the last location the speaker was located at, and begins searching for the speaker at that location. In another embodiment of the invention, the computer 100 returns the video camera 130 to look for the selected speaker from the original location from which the speaker was identified. That is, the video camera 130 was pointing in a certain direction at the time that the target object was identified. The computer 100 causes the camera 132 to point in that direction to begin searching for the speaker. The advantage of such system can be shown in the following example. Assume that a speaker is first identified as sitting at a certain location at a conference table. The user will identify the speaker as being a target while the speaker sits at that location. If the user then chooses to select that speaker as the target to be tracked, the computer 100 will cause the video camera 130 first look for the speaker at the conference table. In another embodiment, the computer searches for the selected target while returning to that pre-set location. In another embodiment of the invention, if the computer 100 does not find the speaker at the pre-set location, that computer 100 causes the video camera 130 to search for the object 140.

In another embodiment of the invention, the graphical user interface, described in FIG. 1 through FIG. 6, is used to track objects other than human beings (e.g., parts used in manufacturing, animals, vehicles).

In another embodiment of the invention, the graphical user interface is used to track objects found in digital movies and computer generated images.

In another embodiment of the invention, the graphical user interface is included in a surveillance system that tracks different types of objects (e.g., people, animals, vehicles).

In another embodiment of the invention, an image of a group of potential target objects is captured. The target objects are identified in the image. This image is then kept for use by the user to select target objects. For example, if an image of a group of people is captured, the user can then define bounding boxes around the individuals to be tracked. The group image is then displayed for the user. The user can then move the cursor over the group image to select specific individuals to be tracked. In one embodiment, as the user moves the cursor over the people, a bounding box appears around each person's image. The bounding box indicates that the user can select that person for tracking.

Each of these embodiments benefit from the ease of use of identifying a target object by keeping an image of that object for selection.

Conclusion

What has been described are a method and apparatus for controlling the tracking of objects. In one embodiment, images, corresponding to target objects, are displayed on the computer monitor. A user then selects the image of a target object that the user wants the computer to track. The computer then tracks that target object.

What is claimed is:

1. A method of tracking a target object using a computer system, the computer system including a computer, a display device, and an imaging device having a field of view, the computer being coupled to the display device and the imaging device, the method comprising the steps of:

capturing a first image from within said field of view of the imaging device using the imaging device, said first image corresponding to said target object;

generating a second image from the first image, the second image corresponding to said target object;

displaying the second image on the display device; and responsive to receiving a selection signal, the computer system controlling the imaging device to track and capture additional images of said target object from within said field of view of the imaging device, the selection signal corresponding to a selection of the second image.

2. The method of claim 1 wherein said capturing said first image includes digitizing a first frame received from said imaging device and displaying said first image on said display device.

3. The method of claim 1 wherein said generating said second image from said first image includes:

receiving a selection of a first area, said first area defining a portion of said first image including an image of the target object; and creating a reduced image of said first image, where said second image includes said reduced image.

4. The method of claim 1 wherein said generating said second image from said first image includes making a copy of said first image, said copy being said second image.

5. The method of claim 1 wherein said generating said second image from said first image includes making a thumbnail image of said first image, said thumbnail image being said second image.

6. The method of claim 1 wherein said generating said second image from said first image is performed in response to the following steps:

searching said first image for an object corresponding to a predetermined type of object; and identifying said object in said first image, said target object corresponding to said object.

7. The method of claim 6 wherein said type of object corresponds to a human being.

8. The method of claim 1 further including the steps of said imaging device capturing a plurality of images corresponding to said field of view, and generating a model from said first image, said model corresponding to said target object, and wherein said computer system controlling the imaging device to track said target object includes the following steps:

receiving a subset of said plurality of images;

causing said computer system to use said model to search said plurality of images for images of said target object; and responsive to said searching, generating imaging device control commands to cause the imaging device to keep said target object in said field of view.

9. The method of claim 1 wherein said second image corresponds to a first area on said display device and wherein said receiving said selection signal includes receiving a mouse click signal corresponding to a mouse click within said first area.

10. A method of tracking a primary target object using a computer system, a video camera, and a display device, said computer system coupled to said video camera and said display device, said method comprising the steps of:

receiving a plurality of frames;

identifying a plurality of target objects in said plurality of frames;

generating a set of images from said plurality of frames, each image of said set of images corresponding to a different target object of said plurality of target objects;

displaying said set of images;

receiving a selection of an image of said set of images causing a selection of said primary target object; and responsive to causing said selection of said primary target object, said video camera tracking and capturing additional images of said primary target object.

11. The method of claim 10 wherein said generating said set of images includes selecting a set of areas from a subset of said plurality of frames, each area of said set of areas corresponding to one of said different target objects, and each image of said set of images corresponding to a frame of said plurality of frames.

12. The method of claim 11 wherein said selecting said set of areas includes receiving a bounding box selection for said each area, said bounding box selection defining said each area.

13. The method of claim 11 wherein said selecting said set of areas includes identifying a first target object of said plurality of target objects, said identifying including searching at least a first frame of said plurality of frames for an object of a predetermined type and finding a first area of said first frame corresponding to said object of said predetermined type, and wherein said generating said set of images includes including a first image, corresponding to said first frame, into said set of images.

14. The method of claim 13 wherein said predetermined type corresponds to a human being.

15. The method of claim 10 wherein said displaying said set of images includes displaying said set of images on said display device, each image corresponding to a different selection area on said display device, and wherein said receiving said selection includes receiving a mouse selection in one selection area.

16. A system for tracking a target object comprising:

means for capturing a first image using an imaging device from within a field of view of the imaging device, said first image corresponding to said target object;

means for generating a second image from the first image, the second image corresponding to said target object;

means for displaying the second image; and means for controlling said imaging device to track and capture additional images of said target object from within said field of view of the imaging device, in response to receiving a selection signal corresponding to a selection of the second image.

\* \* \* \* \*